May 12, 1970    J. S. McGUIRE    3,511,738
HOLLOW STRUCTURAL MEMBERS AND METHOD OF TREATING AN INTERIOR
SURFACE THEREOF
Filed June 13, 1966

INVENTOR.
JOHN S. McGUIRE
BY Fishburn and Gold
ATTORNEYS

United States Patent Office 3,511,738
Patented May 12, 1970

3,511,738
HOLLOW STRUCTURAL MEMBERS AND METHOD
OF TREATING AN INTERIOR SURFACE THEREOF
John S. McGuire, P.O. Box 157, Ozark, Mo. 65721
Filed June 13, 1966, Ser. No. 557,246
Int. Cl. B32b 37/00, 19/02
U.S. Cl. 161—43                               4 Claims

ABSTRACT OF THE DISCLOSURE

A rotationally molded synthetic resin member formed of multiple layers with an outer layer defining a closed shell and an inner layer or core in contact therewith. The inner layer or core is locked to the outer layer by a plurality of coarse particles extending across the innerface of the respective layers providing a mechanical bond therebetween. The multi-layer being produced by rotational molding with the particles being of less density than the outer resin layer whereby in the rotation of the mold with the resin and particles therein the particles are distributed over the inner portion of the outer layer and then a foam resin is introduced into the shell and cured during further rotation of the mold.

---

This invention relates to structural members and methods of making same and more particularly, to the production of high strength skin-core interface bonding in rotationally molded and filled hollow members.

Rotational molding involves the rotation of a closed mold in multiple planes as flowable molding material introduced thereinto sets up or hardens. This produces a hollow integral member, or shell which is often characterized as completely enclosing, preventing access thereinto, except for a small blow-hole or the like to permit equalization of atmospheric pressure between the outside and inside surfaces. It is known to introduce flowable synthetic resins into such hollow members, the resins often being adapted to expand into a rigid foam, thus providing a filling core therein which tends to improve the structural integrity of the member. The structural strength of rotationally molded members, although improved by the introduction thereinto of a core, such as a rigid foam, is still quite limited due to the tendency for slippage under stress at the normally weakly bonded interface between the core and inner surface of the shell.

This invention contemplates a novel means and method for greatly increasing the strength of the bond between the core and inner surface of the shell, thus inhibiting slippage therebetween, as well as retarding any tendency to separate, and thereby greatly increasing the strength and structural integrity of the overall structure.

It is, therefore, the principal objects of the present invention: to provide a structural member produced by rotational molding wherein the inner surface or skin is treated in a novel manner so as to securely bond to a core material introduced thereinto even in absence of significant adhesion directly between the core and shell; to provide such an inner skin treatment in rotationally molded panel construction which does not interfere with usual molding practices; to provide such a treated inner skin or surface which is highly effective at the inner face while normally not substantially altering the properties or external appearance of the shell material; to provide such a construction and method which is versatile, inexpensive and convenient and permits the shell exterior surface to be molded into various finished contours if desired; and to provide such a construction and method which is well suited for its intended purpose.

Other objects and advantages of this invention will become apparent from the following description taken in connection with the accompanying drawings wherein are set forth by way of illustration and example certain embodiments of this invention.

Figure 1:
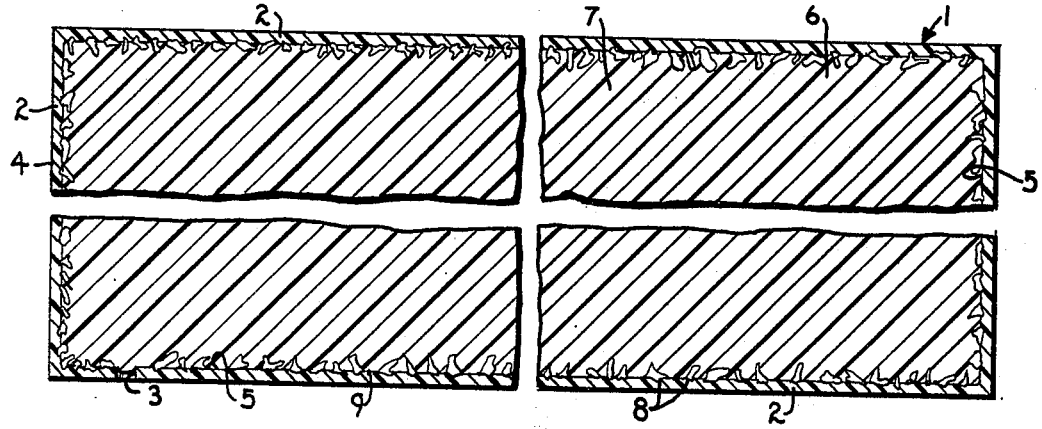
FIG. 1 is a fragmentary transverse cross-sectional view through a rotationally molded hollow panel having an inside skin or surface treated in accordance with this invention, the panel containing a relatively rigid foamed synthetic resin core are bonded to the inside skin.

Referring to the drawings in more detail:

The reference numeral 1 generally indicates a rotationally molded panel embodying this invention. The walls 2 of the panel 1 may be of any suitable rigid rotationally moldable synthetic material, that is, of the type which, either in powder or liquid form, will flow smoothly over the entire inside surface of the mold (not shown) prior to setting-up or hardening. The panel 1, characteristically, is in the form of a hollow shell and contains a blowhole or air passageway 3 extending through at least one of the walls 2 from the outside surface 4 to the inside surface 5 to permit equalization of pressure between the inside and outside of the panel. A suitable substantially rigid foamed-in-place synthetic resin 6 forms a core occupying the interior 7 of the panel, defined by the inside surface 5, after being introduced thereinto, for example, through the blowhole 3 in a conventional manner. A typical rigid foamed material for the core may be one selected from the class of materials commonly described as "rigid urethane foam." The physical properties of the foam material may be suitably varied to produce the optimum functionality of the panel for its intended purpose, the methods and means for varying such properties as strength, modulus, thermoconductivity, and density, being well known in the art.

Referring more specifically to this invention, the novel means and method contemplated herein comprises the introduction into the mold and into contact with the flowable molding resin forming the walls 2, either before or during the cure cycle, of a very coarse material in the form of jagged particles 8 or the like. If a liquid resin is used, the particles 8 are selected with a relatively low density compared to the resin so that they tend to "float" adjacent the inside skin or surface 5 and have portions thereof projecting extensively within the interior 7. If a flowable molding resin powder is used, the density of the particles 8 may be equal to or greater than the powder, since the greater size of the particles 8 will result in a migration above the inside surface under vibratory wedging action of the powder during mold movement. The particles 8, upon completion of the curing cycle, become fixed or secured in the wall 2 although the greater portion of the particles may extend above the surface 5. Examples of the composition of such particles include very coarse saw dust, wood chips, rough ground synthetic resins, crushed corn cobs, crushed rigid synthetic resin foams, coarse mineral products, and coarse fibers. It is desirable, particularly with molding resin powder, that the mold be additionally vibrated during normal molding rotation or turning to aid the particles 8 in rising or migrating above the surface 5. It is further advantageous, with selected types of particles such as fibers, to use electrostatic or magnetic fields to aid in producing optimum projection above the surface 5 during curing.

Figure 2:
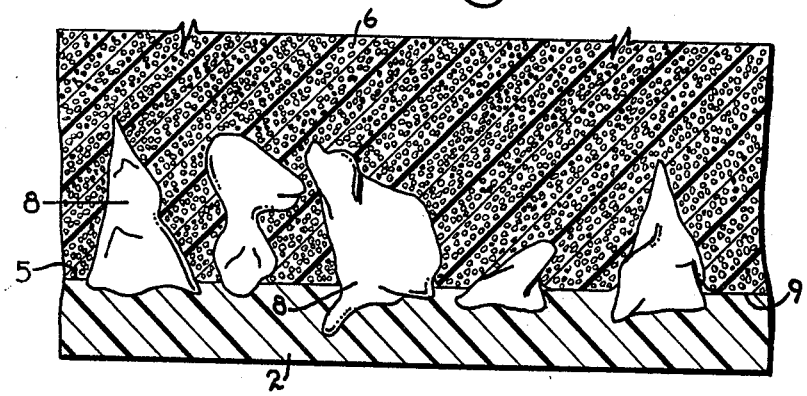
FIG. 2 is a fragmentary cross-sectional view through the panel of FIG. 1 on a greatly enlarged scale, showing the bonded interface structure in greater detail.

As indicated in FIG. 2, the majority of particles 8 will be maintained in various positions extending partially into the interior 7 and, since they are normally spaced from the outside surface 4, will not substantially affect the external appearance or physical properties of the panel walls 2. The foamed resin 6, upon expanding into intimate opposed contact with the inside skin or surface 5, receives the projecting portions of the extending particles 8 thereinto and, upon curing to a rigid structure, tends to completely surround and become secured to same mechanically and in some cases by bonding, thus producing a positive locking cooperation which is highly effective in preventing sliding at the foamed resin and wall interface 9 and, also, separation of the core and wall materials even in absence of natural adhesion therebetween.

Thus, a transverse load on the panel 1 will produce lines of force (not shown) which are not interrupted at the interface but, rather, transferred thereacross so that the foamed resin 6 is forced to carry the maximum load of which it is capable under the particular conditions of deflection.

Even if the physical properties of the foamed resin 6 are selected primarily for the purpose of insulation rather than structural improvement, the described locked interface will produce a substantially increased ability for the panel to support structural loads and thus reduce the weight and quantity of material otherwise required for satisfying structural design conditions.

It is to be understood that although certain forms of this invention have been illustrated and described, it is not to be limited thereto except insofar as such limitations are included in the following claims.

What I claim and desire to secure by Letters Patent is:
1. A multi-layer member comprising
  (a) an outer layer of rigid synthetic resin defining a closed shell, said outer layer having an inner face,
  (b) a core of foamed synthetic resin having an outer face engaging the inner face of said outer layer whereby said faces form an interface between the two layers,
  (c) a plurality of coarse particles respectively extending across said interface and into the respective faces, said particles being of less density than said outer resin layer, said particles having a mechanical bond to the respective faces whereupon said faces remain locked together in absence of substantial natural adhesion between said faces at said interface.

2. The structure as set forth in claim 1 wherein said particles are selected from the group consisting of coarse saw dust, wood chips, ground rigid synthetic resins, crushed rigid foamed synthetic resins, crushed corn cobs, coarse fibers.

3. The structure as set forth in claim 1 wherein said core comprises a rigid foamed synthetic resin.

4. The multi-layer member as set forth in claim 1 wherein the particles are selected from coarse mineral products.

References Cited

UNITED STATES PATENTS

| | | | |
|---|---|---|---|
| 2,862,806 | 12/1958 | Nestor | 264—311 XR |
| 2,916,399 | 12/1959 | Kurz | 156—276 XR |
| 2,948,651 | 8/1960 | Waag. | |
| 2,991,208 | 7/1961 | Stieger | 156—276 XR |
| 3,052,927 | 9/1962 | Hoppe et al. | 264—311 XR |
| 3,126,311 | 3/1964 | Fitzharris | 161—46 |
| 3,391,823 | 7/1968 | Tijms | 264—311 XR |

FOREIGN PATENTS 930,362  7/1963  Great Britain.

ROBERT F. BURNETT, Primary Examiner

W. A. POWELL, Assistant Examiner

U.S. Cl. X.R.

156—79, 242, 276; 161—53, 161, 162, 166; 264—45, 310